July 5, 1932.   E. D. TILLYER   1,865,715
OPHTHALMIC LENS
Filed Oct. 25, 1929
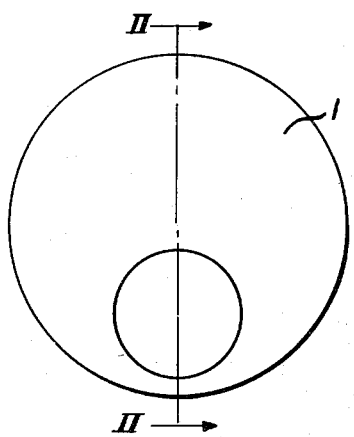
Fig. I
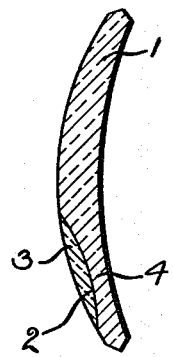
Fig. II
Edgar D. Tillyer
INVENTOR
BY Harry H. Styll
ATTORNEY Patented July 5, 1932

1,865,715

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed October 25, 1929. Serial No. 402,414.

This invention relates to ophthalmic lenses and has particular reference to multifocal lenses formed of lens media which retards certain light rays and to the process by which such lenses may be made.

The principal object of the invention is to provide a lens having two or more fields with the property of retarding undesirable light rays while maintaining a uniform color throughout.

Another object of the invention is to provide lens media of the desired color and properties which will readily unite to form the different focal fields.

Another object of the invention is to provide a multifocal lens which will retard undesirable light rays, be of uniform color and also be free from chromatic aberration.

Another object of the invention is to provide means whereby undesirable shadows will not cast on the face of the wearer from the use of light ray retarding media.

Other objects and advantages will become apparent from the following description taken in connection with the accompanying drawing and it will be apparent that many changes may be made in the details of construction, arrangement of parts and steps in the process without departing from the spirit of the invention as expressed in the accompanying claims. I, therefore, do not wish to be limited to the exact details shown and described as the preferred forms only have been shown by way of illustration:

Referring to the drawing

Fig. I is a front view of an ophthalmic lens.

Fig. II is a section taken on line II—II of Fig. I.

In order to retard certain light rays at each end of the spectrum, known as ultra-violet and infra-red, it is well known that certain chemical constituents may be introduced into any glass through which these rays would ordinarily pass. One commercial glass used for ophthalmic lenses is designed to shut off the ultra-violet rays and transmit freely the visible or desired rays. This glass also has the property of being practically colorless when worn by a member of the white race due to its pinkish tint which prevents shadows being cast upon the face of the wearer as would be the case were an ordinary glass having ultra-violet ray absorbing qualities alone to be used.

The ultra-violet absorption is obtained in this instance by the use of a cerium compound which used alone produces a yellow tint in the glass. Manganese dioxide is therefore used to decolorize this glass and lend a desirable pinkish tint thereto.

I have found that the foregoing glass composition is suitable for one-piece ophthalmic lenses but when a multi-focal lens made of two or more pieces of lens media is desired certain difficulties in the use of this glass make their appearance. If the cerium compound for ultra-violet absorption is used for both the major and minor fields fusion difficulties arise and if to eliminate these difficulties ordinary white flint glass of suitable index of refraction is used it is obvious that the appearance of the finished lens will be marred by the white spot in the surrounding pink distance field.

It is the prime object of my invention therefore to utilize the advantages of glass having undesired light ray absorption and desired color for the manufacture of multifocal lenses which will retain both the characteristics of the former glass and also be free from chromatic aberration. It will be understood that the difficulties of manufacturing these lenses, particularly in the fusing process, are eliminated by the improved process and the lens itself will be free from the defects associated with previous types.

Referring to the drawing wherein similar characters of reference denote corresponding parts throughout the several views I have illustrated in Fig. I a usual form of multifocal lens which can be formed under the conditions to be described although it will be understood that the invention is not confined to a bifocal or to the specific shape or type illustrated and described. The invention is also applicable to other colors.

I first shape by molding or other suitable method my distance portion 1 from lens media having the desired properties. These properties may be a high violet ray absorption, a high transmission of visible rays and a pink or flesh tint to give an almost invisible appearance when held against a white person's skin. The ingredients of such a glass, which may be crown, are the well-known ones including cerium dioxide ($CeO_2$) in sufficient quantities to give high absorption of the ultra-violet rays and a trace of manganese dioxide ($MnO_2$) to decolor and flesh tint the finished glass.

I next form a countersink 2 in the major portion 1 by grinding or other suitable method and polish the surface thereof.

The segment 3 to be inserted in the countersink 2 according to my invention has good fusing qualities combined with a similar color to the distance portion 1 and when united therewith will not cause chromatic aberration.

To obtain the foregoing advantages I form my segment 3 of barium crown glass instead of the usual flint to eliminate chromatic aberration in the finished lens and omit the cerium dioxide. By omitting the cerium dioxide I consequently do not obtain any ultra-violet ray absorption in the segment 3 apart from the major blank 1. However, as there is a layer 4 of the cerium containing glass behind the segment 3 after fusion a good absorption of these undesirable rays will take place at this point.

The advantage of omitting the cerium dioxide is that the fusion qualities are not impaired as would be the case if both major and minor portion contained cerium. It is almost impossible to fuse two glasses together if both contain cerium dioxide and it will be apparent that I have provided means whereby this fusion difficulty is overcome without detriment to the usefulness and efficiency of the finished lens, but on the contrary to its ultimate improvement.

In order to obtain a similar shade of color in the segment 3 as in the major portion 1 I add a trace of manganese dioxide as in the glass used for the major portion. Upon shaping and fusing the segment 3 into the countersink 2 it will be apparent that no fusion difficulties will be encountered and that the two glasses will blend harmoniously together as a single color. The light spot often obtained by prior art methods of using ordinary flint glass for the segment portion in order to overcome the fusion difficulties outlined is not present in my improved lens and chromatic aberration is absent.

Having fused the two portions together the lens may be finished in the usual way by grinding and polishing the base and prescription curvatures on either side and edging the lens to the outline shape desired.

It will be apparent that if desired other coloring mediums as well as manganese dioxide may be used. For example the yellow, red and brown-skinned races would not require a pink tinted glass as do the white skinned ones and other mediums could be employed for the various colors desired. The principle of the invention will hold true for any glass and this will be recognized from the foregoing description as the principle of making the segment portion of a multifocal lens of the same color as the major portion with undesired light ray retardance and good fusion qualities.

Having described my invention, I claim:

1. A multifocal or bifocal lens comprising a major portion of crown glass having a countersink therein, said glass including in its composition an amount of cerium sufficient to absorb a desired amount of the ultra violet rays and an amount of manganese dioxide sufficient to render said portion a pink color and a button of barium crown glass fused in said countersink, said button including in its composition a sufficient amount of manganese dioxide to render it the same color as the major portion.

2. A multifocal or bifocal lens comprising a major portion of crown glass having a countersink therein, said glass including in its composition an ingredient of amount sufficient to absorb a desired amount of the ultra violet rays and an amount of another ingredient sufficient to render said portion a pink color and a button of barium crown glass fused in said countersink, said button including in its composition a sufficient amount of said coloring ingredient to color the button the same shade as the major portion.

3. A multifocal or bifocal lens comprising a major portion of glass having one index of refraction and a certain relative dispersion and having a countersink therein, said glass including in its composition an ingredient of amount sufficient to absorb a desired amount of the ultra violet rays and an amount of another ingredient sufficient to render said portion a pink color and a button fused in said countersink said button being of glass of different index of refraction and of the same relative dispersion as the glass of the major portion and including in its composition a sufficient amount of said coloring ingredient to color the button the same shade as the major portion.

4. A multifocal or bifocal lens comprising a major portion of glass having one index of refraction and a certain relative dispersion and having a countersink therein, said glass including ingredients that are absorptive of ultra violet rays and give it a pink color, and a button of glass of a different index of refraction but of substantially the same relative dispersion and of the same color as the glass of the major portion fused in said countersink.

EDGAR D. TILLYER.